Oct. 21, 1969          P. J. NOVAK          3,473,651
DISPENSING PACKAGE OF FISHING LURE NODULES
Filed Oct. 17, 1968
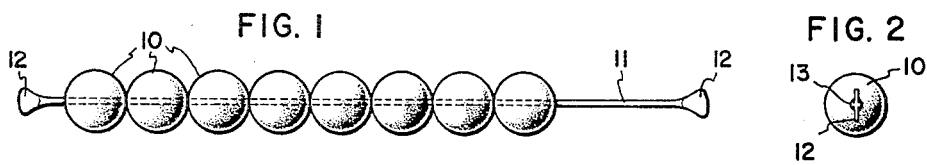
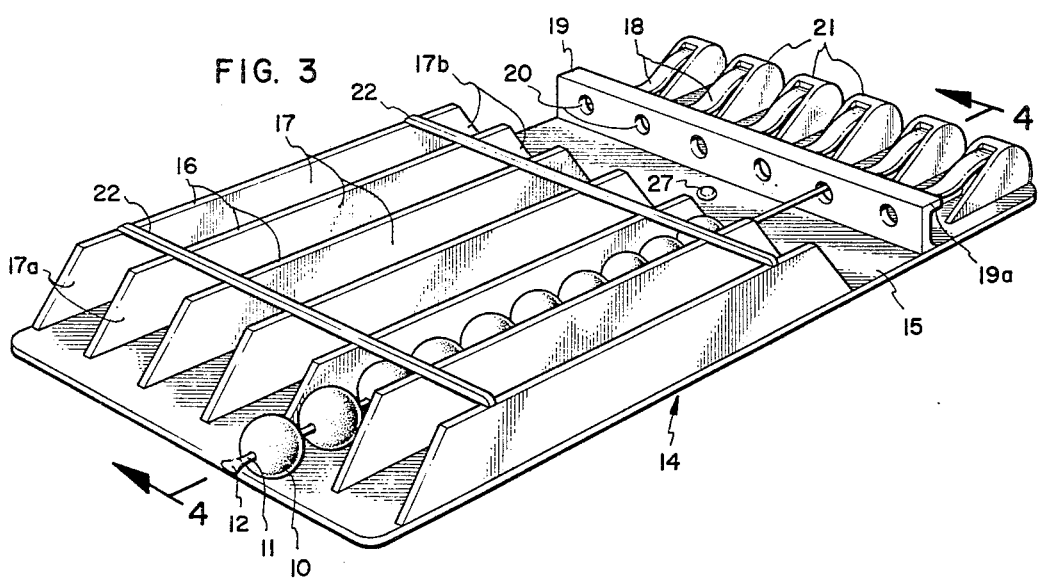
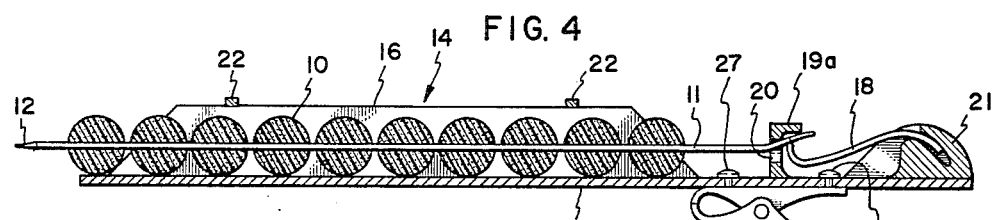
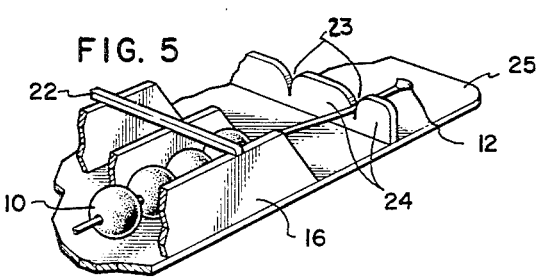
INVENTOR.
PHILLIP J. NOVAK
BY *Mallinckrodt and Mallinckrodt*
ATTORNEYS

United States Patent Office 3,473,651
Patented Oct. 21, 1969

1

3,473,651
DISPENSING PACKAGE OF FISHING LURE
NODULES
Phillip J. Novak, 1816 Westminster Ave.,
Salt Lake City, Utah 84108
Filed Oct. 17, 1968, Ser. No. 768,316
Int. Cl. B65d *83/04*
U.S. Cl. 206—56                                         14 Claims

ABSTRACT OF THE DISCLOSURE

A dispensing package containing fishing lure nodules that are made from foamed plastic or the like. A protective casing has walls defining at least one, but usually several, elongate and longitudinally open troughs adapted to receive respective strands of nodules and to retain one set of ends thereof against longitudinal pull exerted for removing nodules from the opposite set of ends, which are free for that purpose. The strands are preferably lengths of thermoplastic filament, whose ends are deformed by heat upsetting to provide relatively thin but broad fins for normally retaining nodules strung thereon but permitting forced removal thereof successively.

RELATED APPLICATIONS

Although the disclosure herein is original with this patent application, it is concerned with the body nodules disclosed in my copending application for United States Patent Ser. No. 703,017, filed Feb. 5, 1968, and entitled "Artificial Dry Fly Fishing Lure."

BACKGROUND OF THE INVENTION

*Field.*—This invention is concerned with packages for nodules to be dispensed individually as needed and particularly nodules of foamed plastic or of fragile material of the nature of foamed plastic as used to make up artificial fishing lures simulating insects.

*State of the art.*—So far as is known nodules of the type concerned have been available heretofore only in bulk form, requiring a fisherman to reach into a container with his fingers and remove one or more as required to replace those damaged in use of a fishing lure. This is usually extremely inconvenient for the fisherman and often results in loss or breakage of many of the lightweight and fragile nodules, not to mention fraying of the nerves of the fisherman.

SUMMARY OF THE INVENTION

The invention provides for convenient mechandizing, storage, and individual dispensing of foamed plastic nodules and the like by means of a dispensing package that is handy to carry in condition for immediate use without fumbling, spillage, or breakage.

The nodules are strung on lengths of thread to form strands, which are packaged in protective casings permitting successive removal of individual nodules from the one or more strands in a single casing.

The casing is formed by walls defining one or more elongate open troughs, disposed side-by-side when there are more than one. Each trough has means at one of its ends for securing an end of a strand of nodules, which extends along and within the trough, and retaining means extending transversely of the trough for holding the strand in the trough. The opposite end of the trough is open and the opposite end of the strand is free, so the terminal nodule at the free end can be forcefully pulled from the strand. The remaining nodules on the strand can be pushed along the trough toward the free end thereof by finger manipulation exerted through the trough opening.

Each strand comprises a thread, whose free end, at

2 least, is deformed to prevent any but forceful removal of a nodule from the thread. It is preferred that the thread be a thermoplastic filament, both of whose ends are upset by heat to provide a relatively thin and broad fin that prevents removal of a nodule except by forceful pulling thereof over the fin.

DESCRIPTION OF THE DRAWING

There are shown in the accompanying drawing specific constructions constituting the best mode presently contemplated for carrying out the invention.

FIG. 1 is a view in side elevation of a strand of nodules strung on a filament whose ends are upset to retain the nodules as strung;

FIG. 2 is a view in end elevation of the strand of nodules;

FIG. 3 is a pictorial view looking from above and from the dispensing end of a package whose casing is formed with multiple troughs arranged side-by-side, a strand of nodules being shown secured in one of the troughs;

FIG. 4 is a longitudinal vertical section taken on the line 4—4 of FIG. 3; and

FIG. 5 is a fragmentary view corresponding to the upper, foreground, corner portion of FIG. 3, but showing a somewhat different construction.

DETAILED DESCRIPTION OF ILLUSTRATED EMBODIMENTS

Fundamental to the dispensing package of the invention is the provision of nodules 10 as a strand, such as is shown in FIGS. 1 and 2, wherein the individual nodules 10 are strung on a thread 11, which, in the illustrated instance, is a filament of material that can be easily deformed, as by upsetting, to provide enlarged fin ends 12 that normally retain the nodules on the filament yet permit forced withdrawal of the individual nodules successively as needed.

In preparing the strands, a filament of relatively great length may be strung with the nodules and then cut into appropriate lengths 11 along with the upsetting operations. Although a metal wire can be used as the filament and the upsetting accomplished by hammering, for example, it is preferred to employ a thermoplastic filament and to heat upset the filament at intervals in making the individual strands. Regardless of the material employed, however, the fin ends 12 produced for the individual strands in this manner will be relatively thin and broad so that the individual nodules must be pulled from the strand by the exercise of force. The resulting slight cutting or breaking of the foamed plastic material at the margins of the stringing holes, see 13, FIG. 2, through the nodules will not harm them for the purpose intended.

If the thread on which the nodules are strung is of some other material not adapted to upsetting, there are a variety of ways in which its ends can be enlarged for the present purpose, e.g. by the application thereto of an adhesive that sets hard and exerts frictional resistance against loss of the nodules from the thread.

As packaged for sale and use or by the consumer who purchases a dispenser and strings of nodules separately, the strung nodules 10 are protectively encased in a casing which is preferably rigid. Although the casing may be formed for the reception of a single strand, it is preferred that it accommodate multiple strands. In the form illustrated in FIGS. 3 and 4, the casing 14 is fabricated to provide a base wall 15, presenting a broad surface, and partition walls 16 thereon dividing the surface into a side-by-side series of elongate, longitudinally open troughs 17, each of which is adapted to receive a strand of nodules 10 in the manner illustrated.

The trough ends 17a at one end of the casing 14 are open and serve to dispense individual nodules 10 from the strands in the respective troughs 17. At the opposite end of the casing and opposite ends 17b of the troughs 17 are means for temporarily securing the strands against the endwise pull exerted when nodules are removed at the dispensing ends of the troughs. In this embodiment, such means take the form of spring clips 18 reactive against the overhanging lip 19a of an upstanding, transverse wall member 19 of the casing, through openings 20 of which the filaments 11 of the strands extend. The clips 18 are anchored in recessed mounts 21 secured to base wall 15 of the casing.

Means are provided for retaining the strands within the respective troughs 17. As illustrated, such means take the form of relatively narrow strips 22 extending transversely across the trough openings and secured to the partition walls 16. Similar strips can be provided by merely encircling the casing with rubber bands.

Although the use of manually operable spring clips as in FIGS. 1 and 2 is preferred, the securing means can be in some other form, as, for example, simply by frictional holding slos 23, FIG. 5, provided in mutually spaced relationship in upstanding, transverse wall member 24 at the holding end of the base wall 25 of a casing modified in this respect. The slots 23 are narrower than the upset or fin end portion 12 of respective strands of nodules, so such strands will be held against being pulled through the slots 23 when nodules 10 are pulled from opposite ends of such strands.

To enable a fisherman to easily attach the package to his clothing, e.g. to a pocket so as to be exposed externally thereof for convenient access, a spring clip 26 may be affixed, as by rivets 27, to the casing externally of the troughs, see FIG. 4.

Whereas this invention is here described and illustrated with respect to certain forms thereof, it is to be understood that many variations are possible.

I claim:

1. A dispensing package, comprising
a protective casing having walls defining at least one elongate, longitudinally open trough adapted to receive a strand of foamed plastic nodules for fishing lures, said trough having an open end for removal of individual nodules from the strand;
means at the opposite end of said trough for securing one end of said strand against endwise pull exerted on said strand at the said open end of the trough; and
retaining means for holding the strand within the trough.

2. A dispensing package in accordance with claim 1, including a strand of formed plastic nodules secured and retained within the trough of the casing, said nodules being strung on a length of thread that extends freely from its secured end and has is opposite end formed to normally retain said nodules on the thread but to permit forced removal thereof succesively.

3. A dispensing package in accordance with claim 2, wherein the thread is a filament having its free end formed as relatively thin and broad fin.

4. A dispensing package in accordance with claim 3, wherein the filament is thermoplastic, with its free end heat upset.

5. A dispensing package in accordance with claim 1, wherein the strand securing means comprises an open-mouthed slot in the casing adapted to receive the thread just short of the end thereof that is to be secured.

6. A dispensing package in accordance with claim 1, wherein the means for securing one end of the strand is a manually releasable, spring clip.

7. A dispensing package in accordance with claim 1, wherein there is provided an upstanding, transverse, casing wall member through which the secured end of the strand is threaded.

8. A dispensing package in accordance with claim 7, wherein the means for securing one end of the strand is a spring clip, and the casing wall member has an overhanging lip against which the spring clip is reactive.

9. A dispensing package in accordance with claim 1, additionally including a spring clip on the casing, externally of the trough, for securing the package to a fisherman's clothing.

10. A dispensing package in accordance with claim 1, wherein the protective casing includes a base wall presenting a broad surface, and partition walls thereon dividing said surface into a side-by-side series of elongate, trough compartments for receiving, respectively, individual strands of the nodules.

11. A dispensing package in accordance with claim 10, wherein the retaining means constitute relatively narrow strips extending transversely of the partition walls across the trough openings and spaced widely enough to permit finger access to individual nodules.

12. As an article of manufacture, a collection of foamed plastic fishing lure nodules mounted to be dispensed individually and successively, comprising
a length of thread; and
foamed plastic fishing lure nodules threaded on said thread to form a strand,
said thread having its ends formed to normally retain said nodules thereon but to permit forced successive removal thereof.

13. An article of manufacture according to claim 12, wherein the thread is a filament having its ends upset to form relatively thin and broad fins, respectively.

14. An article of manufacture according to claim 13, wherein the filament is of thermoplastic with its ends heat upset.

References Cited

UNITED STATES PATENTS

| | | | |
|---|---|---|---|
| 2,939,147 | 6/1960 | Jacobson | 206—56 |
| 3,206,068 | 9/1965 | McQuillion et al. | 206—56 |

JAMES B. MARBERT, Primary Examiner